United States Patent [19]

Nishida

[11] Patent Number: 5,497,432

[45] Date of Patent: Mar. 5, 1996

[54] CHARACTER READING METHOD AND APPARATUS EFFECTIVE FOR CONDITION WHERE A PLURALITY OF CHARACTERS HAVE CLOSE RELATIONSHIP WITH ONE ANOTHER

[75] Inventor: Hirobumi Nishida, Aizuwakamatsu, Japan

[73] Assignee: Ricoh Company, Ltd., Tokyo, Japan

[21] Appl. No.: 111,461

[22] Filed: Aug. 23, 1993

[30] Foreign Application Priority Data

Aug. 25, 1992 [JP] Japan .................................. 4-226185

[51] Int. Cl.$^6$ ..................................................... G06K 9/34
[52] U.S. Cl. ........................ 382/178; 382/229; 382/226; 382/186; 382/259
[58] Field of Search .................................. 382/9, 13, 14, 382/15, 16, 21, 55

[56] References Cited

U.S. PATENT DOCUMENTS

| | | | |
|---|---|---|---|
| 4,654,873 | 3/1987 | Fujisawa et al. | 382/9 |
| 4,718,102 | 1/1988 | Crane et al. | 382/13 |
| 5,029,223 | 7/1991 | Fujisaki | 382/13 |
| 5,050,219 | 9/1991 | Maury | 382/9 |
| 5,050,229 | 9/1991 | Barski et al. | 382/55 |
| 5,151,950 | 9/1992 | Hullender | 382/13 |
| 5,204,915 | 4/1993 | Nishida | 382/21 |
| 5,313,527 | 5/1994 | Guberman et al. | 382/13 |

OTHER PUBLICATIONS

"Recognition of Connected Numeral Strings", in Proceeding of First International Conference on Document Analysis and Recognition, Saint Malo, France, Sep. 30–Oct. 1, 1991, pp. 731–739.

"Segmentation of Automatically Located Handwritten Words", in Proceedings of Second International Workshop on Frontiers in Handwriting Recognition, Bonas, France Sep., 23–27, 1991 pp. 33–44.

"An Augmented Segmentation Algorithm for Connected Handwritten Numerals", in Electrical Communication Society General National Meeting, 1984, No. 1588.

*Primary Examiner*—Leo Boudreau
*Assistant Examiner*—David R. Anderson
*Attorney, Agent, or Firm*—Popham, Haik, Schnobrich & Kaufman, Ltd.

[57] ABSTRACT

A dividing step (a) divides into segments at least one character line forming input characters to be read. A partial-figure forming step (b) forms partial figures by combining segments from among the thus obtained segments. A character reading step (c) attempts to read each of said partial figures as a character. A network forming step (d) forms a network wherein partial figures, among the partial figures, which have been read in said character-reading step (c) are used as nodes and said nodes are connected with one another by links, and wherein said links respectively have appropriate weights. An optimum-path selecting step (e) selects an optimum path from among paths existing in said network so that said optimum path comprises nodes, from among said nodes, which respectively correspond to said input characters.

11 Claims, 18 Drawing Sheets

F I G. 7

| No. | Xmin | Xmax | Ymin | Ymax | LENGTH |
|---|---|---|---|---|---|
| 0 | 0 | 16 | 0 | 18 | 30.739 |
| 1 | 8 | 16 | 18 | 20 | 8.31883 |
| 2 | 7 | 22 | 18 | 36 | 29.0585 |
| 3 | 24 | 37 | 8 | 35 | 39.4794 |
| 4 | 31 | 34 | 0 | 8 | 8.5474 4 |
| 5 | 34 | 45 | 8 | 8 | 11 |
| 6 | 34 | 49 | 8 | 28 | 25.1086 |
| 7 | 45 | 51 | 8 | 9 | 6.0827 6 |
| 8 | 51 | 54 | 0 | 9 | 9.4868 3 |
| 9 | 54 | 66 | 0 | 13 | 18.7808 |
| 10 | 57 | 66 | 13 | 34 | 27.9149 |
| 11 | 65 | 70 | 34 | 40 | 7.8481 9 |
| 12 | 65 | 81 | 33 | 34 | 16.0828 |
| 13 | 80 | 86 | 5 | 17 | 13.5357 |
| 14 | 80 | 89 | 0 | 5 | 11.9137 |
| 15 | 89 | 95 | 1 | 3 | 6.3245 6 |
| 16 | 86 | 105 | 14 | 19 | 20.9079 |
| 17 | 86 | 108 | 17 | 41 | 32.6869 |
| 18 | 95 | 105 | 3 | 14 | 15.678 |

| NO. | SEGMENT NO. | Xmin | Xmax | Ymin | Ymax | LENGTH | CHARACTER CODE | DEGREE OF SIMILARITY | SCORE |
|---|---|---|---|---|---|---|---|---|---|
| 0 | 0-2 | 0 | 22 | 0 | 36 | 68.12 | 3 | 0.17 | 11.52 |
| 1 | 3-6 | 24 | 49 | 0 | 35 | 84.14 | 4 | 0.43 | 36.48 |
| 2 | 3-7 | 24 | 51 | 0 | 35 | 90.22 | 4 | 0.31 | 27.90 |
| 3 | 8-10 | 51 | 66 | 0 | 34 | 56.18 | 5 | 0.42 | 23.37 |
| 4 | 8-11 | 51 | 70 | 0 | 40 | 64.03 | 5 | 0.39 | 25.17 |
| 5 | 8-12 | 51 | 81 | 0 | 40 | 80.11 | 5 | 0.22 | 17.90 |
| 6 | 9-10 | 54 | 66 | 0 | 34 | 46.70 | 5 | 0.40 | 18.70 |
| 7 | 9-11 | 54 | 70 | 0 | 40 | 54.54 | 5 | 0.39 | 21.06 |
| 8 | 9-12 | 54 | 81 | 0 | 40 | 70.63 | 5 | 0.36 | 25.16 |
| 9 | 13-18 | 80 | 108 | 0 | 41 | 101.05 | 6 | 0.19 | 19.12 |
| 10 | 14-18 | 80 | 108 | 0 | 41 | 87.51 | 5 | 0.52 | 45.87 |
| 11 | 15-18 | 86 | 108 | 1 | 41 | 75.60 | 5 | 0.67 | 50.79 |

FIG.13A

| NODE | DESTINATION | WEIGHT |
|---|---|---|
| ROOT | 0 | 0.0 |
|  | 1 | 68.12 |
|  | 2 | 68.12 |
| 0 | 1 | 0.0 |
|  | 2 | 0.0 |
|  | 3 | 90.22 |
|  | 4 | 90.22 |
|  | 5 | 90.22 |
|  | 6 | 99.71 |
|  | 7 | 99.71 |
|  | 8 | 99.71 |
| 1 | 3 | 6.08 |
|  | 4 | 6.08 |
|  | 5 | 6.08 |
|  | 6 | 15.57 |
|  | 7 | 15.57 |
|  | 8 | 15.57 |
|  | 9 | 86.19 |
|  | 10 | 99.73 |
|  | 11 | 111.64 |
| 2 | 3 | 0.0 |
|  | 4 | 0.0 |
|  | 5 | 0.0 |
|  | 6 | 9.49 |
|  | 7 | 9.49 |
|  | 8 | 9.49 |
|  | 9 | 80.11 |
|  | 10 | 93.65 |
|  | 11 | 105.56 |
| 3 | END | 124.98 |
|  | 9 | 23.93 |
|  | 10 | 37.47 |
|  | 11 | 49.38 |
| 4 | END | 108.90 |
|  | 9 | 16.08 |
|  | 10 | 29.62 |
|  | 11 | 41.53 |

FIG.13B

| NODE | DESTINATION | WEIGHT |
|---|---|---|
| 5 | END | 101.05 |
|  | 9 | 0.0 |
|  | 10 | 13.54 |
|  | 11 | 25.45 |
| 6 | END | 124.98 |
|  | 9 | 23.93 |
|  | 10 | 37.47 |
|  | 11 | 49.38 |
| 7 | END | 108.90 |
|  | 9 | 16.08 |
|  | 10 | 29.62 |
|  | 11 | 41.53 |
| 8 | END | 101.05 |
|  | 9 | 0.0 |
|  | 10 | 13.54 |
|  | 11 | 25.54 |
| 9 | END | 0.0 |
| 10 | END | 0.0 |
| 11 | END | 0.0 |

FIG. 19

| NO. | Xmin | Xmax | Ymin | Ymax | LENGTH |
|---|---|---|---|---|---|
| 0 | 7 | 8 | 21 | 23 | 2.23607 |
| 1 | 0 | 23 | 0 | 23 | 53.9508 |
| 2 | 8 | 30 | 23 | 35 | 32.0942 |
| 3 | 27 | 30 | 23 | 31 | 8.56062 |
| 4 | 30 | 47 | 29 | 31 | 17.198 |
| 5 | 36 | 47 | 1 | 29 | 30.3421 |
| 6 | 47 | 64 | 20 | 29 | 23.2221 |
| 7 | 47 | 64 | 21 | 42 | 46.5353 |
| 8 | 58 | 64 | 1 | 21 | 21.1734 |
| 9 | 72 | 79 | 1 | 36 | 35.902 |

FIG. 20

| NO. | SEGMENT NO. | Xmin | Xmax | Ymin | Ymax | LENGTH | CHARACTER CODE | DEGREE OF SIMILARITY | SCORE |
|---|---|---|---|---|---|---|---|---|---|
| 0 | 0-2 | 0 | 30 | 0 | 35 | 88.28 | 5 | 0.18 | 15.60 |
| 1 | 0-3 | 0 | 30 | 0 | 35 | 96.84 | 5 | 0.76 | 73.53 |
| 2 | 3-5 | 27 | 47 | 1 | 31 | 56.10 | 7 | 0.15 | 8.44 |
| 3 | 4-5 | 27 | 47 | 1 | 31 | 47.54 | 7 | 0.41 | 19.34 |
| 4 | 6-8 | 47 | 70 | 1 | 42 | 90.93 | 9 | 0.44 | 39.70 |
| 5 | 9-9 | 72 | 79 | 1 | 36 | 35.90 | 1 | 0.39 | 13.83 |

FIG.22

| NODE | DESTINATION | WEIGHT |
|---|---|---|
| ROOT | 0 | 0 |
|  | 1 | 0 |
|  | 2 | 88.28 |
|  | 3 | 96.84 |
| 0 | 2 | 0 |
|  | 3 | 8.56 |
|  | 4 | 56.10 |
| 1 | 2 | 0 |
|  | 3 | 0.0 |
|  | 4 | 47.54 |
| 2 | END | 126.83 |
|  | 4 | 0.0 |
|  | 5 | 90.93 |
| 3 | END | 126.83 |
|  | 4 | 0 |
|  | 5 | 90.93 |
| 4 | END | 35.90 |
|  | 5 | 0 |
| 5 | END | 0 |

CHARACTER READING METHOD AND APPARATUS EFFECTIVE FOR CONDITION WHERE A PLURALITY OF CHARACTERS HAVE CLOSE RELATIONSHIP WITH ONE ANOTHER

BACKGROUND OF THE INVENTION

The present invention relates to a character reading method, in particular, to a character reading method effective for reading a string of hand-written characters in which a plurality of characters are close to one another. (The term "string of characters" will also be described as "series of characters" or "character series", hereinafter and in the drawings.)

A string of free-format hand-written characters may comprise string of characters that are close to one another. For example, the adjacent characters may come in contact with one another. Such a condition may cause problems in reading the characters. The problem is to enable appropriate splitting of the string of characters into individual characters.

The following methods are known for handling such a condition.

(A) A projection histogram is used. This projection histogram is obtained by projecting, in a direction perpendicular to the string, the string of characters on a line parallel to the string. Then, a minimum point in the histogram is determined to be a candidate of a position where the characters are adjacent to one another. (This method (A) disclosed in a second literature described below.)

(B) A discriminant analysis method is used for determining a straight line which splits the string of characters where the characters are adjacent to each other so as to split the string into the individual characters appropriately. The discriminant analysis method is performed on the two-dimensional distribution of pixels constituting the string of characters. (This method (B) is disclosed in a first literature described below.)

(C) As a result of tracing the contour of the string of characters, concavities are detected on the contour along both sides of the string, the contour extending along the direction of extension of the string. Then, a line is made by connecting a bottom of the detected concavity along one side of the string and another bottom of the detected concavity along the other side of the string. The connected bottoms are aligned with each other. The formed line is determined to be a line for appropriately splitting the string into the individual characters. (This method (C) is disclosed in the second literature described below.)

(D) In order to determine a line for appropriately splitting the string of characters into the individual characters, the following method can be executed. Starting from a bottom point of a detected concavity such as mentioned in the above method (D), pixels are traced successively so as to form the line for splitting the string, as follows. Either if the current pixel is a black pixel or if pixels on both sides of the current pixel are either both black pixels or both white pixels, then the current pixel is moved, by one pixel, to a bottom side pixel. In another case, that is, if a pixel of one side is a black pixel and a pixel of the other side is a white pixel, then the current pixel is moved laterally by one pixel toward the black pixel. (This method (D) is disclosed in the second literature described below.)

(E) Two contours of and along the direction of extension of the string of the characters, extending on both sides of the string, are respectively traced. In this tracing, the tracing points on both contours are aligned with one another in the direction perpendicular to the direction of extension of the string of characters. Then, in the tracing, if the distance between the tracing points respectively corresponding to both contours varies sharply, then the current points are connected to one another so as to form a candidate for a line for splitting the string appropriately. (This method (E) is disclosed in a third literature described below.)

(F) If the string comprises two characters respectively comprising loops, for example, the characters "0" and/or "9", the following method is used to split the characters. In contour tracing such as mentioned above, the contour extending in one side of the extension of the string may have two adjacent protrusions respectively corresponding to the two loops of the adjacent characters. Simultaneously, the contour extending in the other side of the extension of the string may have two adjacent protrusions respectively corresponding to the two loops of the above adjacent characters. Further, both the contours respectively may have concavities between the respective adjacent protrusions. The two concavities are then connected with one another so as to form a line for splitting the adjacent characters. (This method (F) is disclosed in the third literature described below.)

The above mentioned three literatures will now be described.

The first literature: By F. Kimura and M. Shridhar, "Recognition of connected numeral strings", in Proceedings of First International Conference on Document Analysis and Recognition, Saint Malo, France, Sep. 30–Oct. 1, 1991, pp. 731–739.

The second literature: By R. Fenrich, "Segmentation of automatically located handwritten words", in Proceedings of Second International Workshop on Frontiers in Handwriting recognition, Bonas, France, Sep. 23–27, 1991, pp. 33–44.

The third literature: By Fujisawa and Michino, "An Augmented Segmentation Algorithm for Connected Handwritten Numerals", in Electrical Communication Society General National Meeting, 1984, No.1588.

A particular problem in reading a string of handwritten characters is as follows. In an example of FIG. 16, where four numerals are written, a portion of the first numeral "5" overhangs or overlaps over a portion of the second numeral "7". This is because the two characters are close to one another. Such a condition results in the above particular problem. The problem is that it is difficult to form a line appropriate for splitting the string so as to separate the numerals into the respective characters.

The above-mentioned methods of the prior art merely utilize statistical properties or utilize information associated with pixels located at an edge portion of the corresponding image, such as utilizing a projection (A), a pixel distribution (B), and/or contours (C), (E) and (F). However, these methods of the prior art do not utilize information required for detecting overhanging or overlapping areas (of adjacent figures) such as mentioned above. In these methods of the prior art, other various complicated measures can be taken to detect such an overhanging or overlapping construction. In the method (D), not only information associated with pixels located at an edge portion of the corresponding image but also information of internal pixels can be utilized. However, this method depends merely on heuristics. Thus, reliability or applicability is not evident.

Further, as suggested in the method disclosed in the above second literature, the above methods (A)–(F) may be utilized in appropriate combination thereof according to the manners in which two adjacent characters are connected with one another. However, in such a combining method, several method have to be executed in parallel. Thus, a quantity of processing and a capacity of the programs for achieving the method is increased. Further, another problem may occur such as that several kinds of solutions appear for appropriately splitting the string of characters. In this case, it may be difficult to select an optimum solution from among the obtained several solutions.

Furthermore, these methods of the prior art basically assume connection between only two characters. Thus, it is necessary to apply a similar method recursively for dealing with connection among more than two characters.

SUMMARY OF THE INVENTION

An object of the present invention is to provide a method for character reading. This method according to the present invention utilizes not only information associated with pixels located at an edge portion, that is, pixels correspond to a contour of the image comprising the string of characters, but also utilizes information of the construction of the entire string of characters. Thus, the method can deal with any manner of connection among a plurality of characters including not only between two characters but also among more than two characters. The method can further deal with a string of characters in any case where how many characters constitute the string is either unknown or known. The method can easily read the string of characters despite any such condition.

To achieve the object of the invention, a character reading method according to the present invention comprises steps of:

a dividing step (a) for dividing into segments at least one character line constituting of input characters to be read;

a partial-figure forming step (b) for forming partial figures by combining segments among said segments;

a character reading step (c) for attempting to read each of said partial figures as a character;

a network forming step (d) for forming a network wherein partial figures, among the partial figures, which have been read in said character-reading step (c) are used as nodes and said nodes are connected with one another by links, and wherein said links respectively have appropriate weights;

an optimum-path selecting step (e) for selecting an optimum path from among paths existing in said network so that said optimum path comprises nodes, from among said nodes, which should respectively correspond to said input characters.

Other objects and further features of the present invention will become more apparent from the following detailed description when read in conjunction with the accompanying drawings.

BRIEF DESCRIPTION OF THE DRAWINGS

FIG. 7 shows a table in which the partial curves or segments shown in FIG. 6 associated with respective data are listed;

FIG. 11 shows a table in which partial figures, among the partial figures shown in FIGS. 8A–10O, which have been read as characters are listed;

FIGS. 13A and 13B show tables in which construction of the network shown in FIG. 12 is represented in a table format with associated data obtained in the method of FIG. 1;

FIG. 19 shows a table in which the partial curves or segments shown in FIG. 18 associated with respective data are listed;

FIG. 20 shows a table in which partial figures, among the partial figures formed using the segments shown in FIG. 18, which have been read as characters, are listed;

FIGS. 22 shows a table in which construction of the network shown in FIG. 21 is represented in a table format with associated data obtained in the method of FIG. 1;

DESCRIPTION OF THE PREFERRED EMBODIMENT

Figure 1:
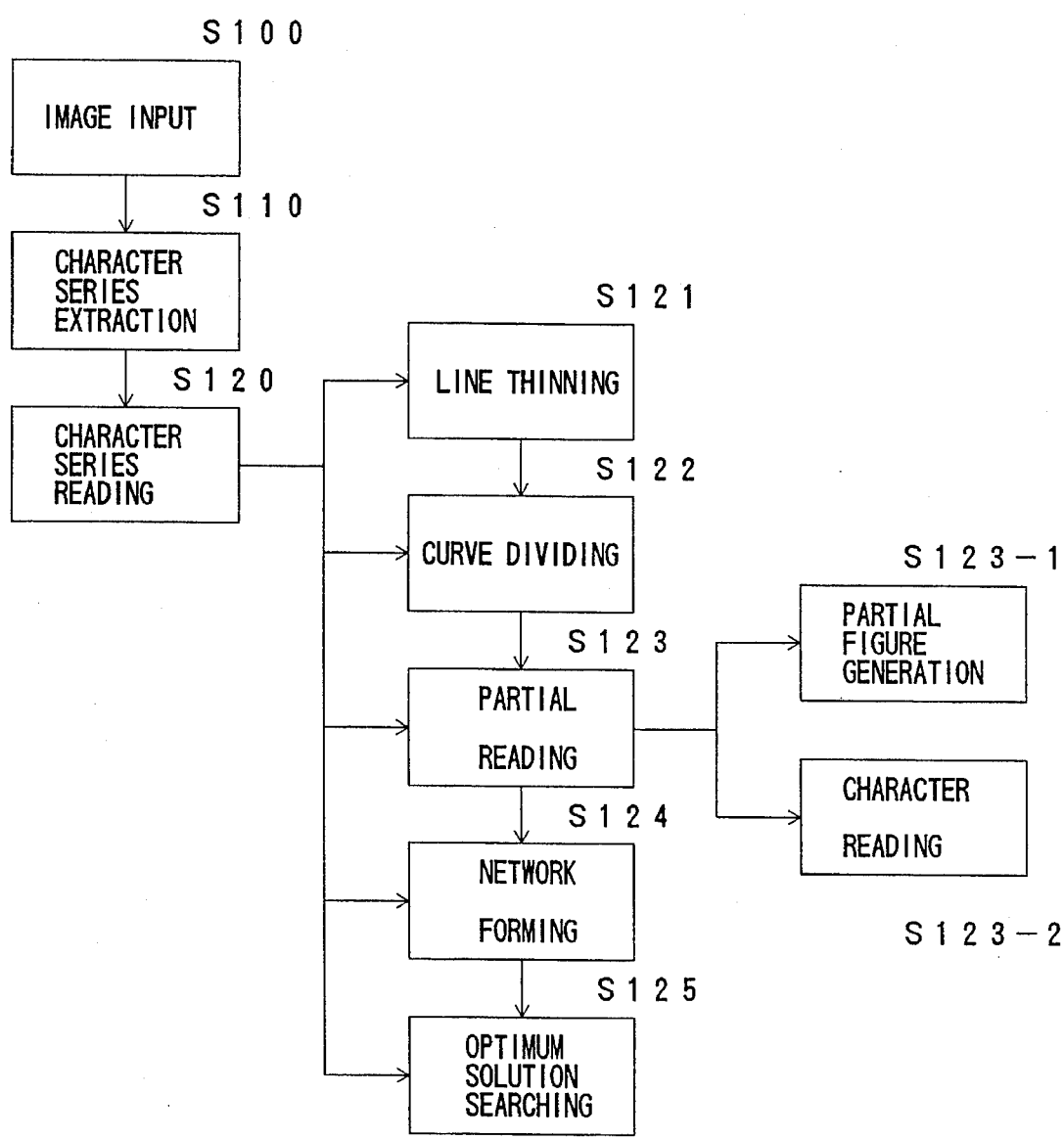
FIG. 1 shows the principle of one embodiment of a character reading method according to the present invention.
Figure 2:
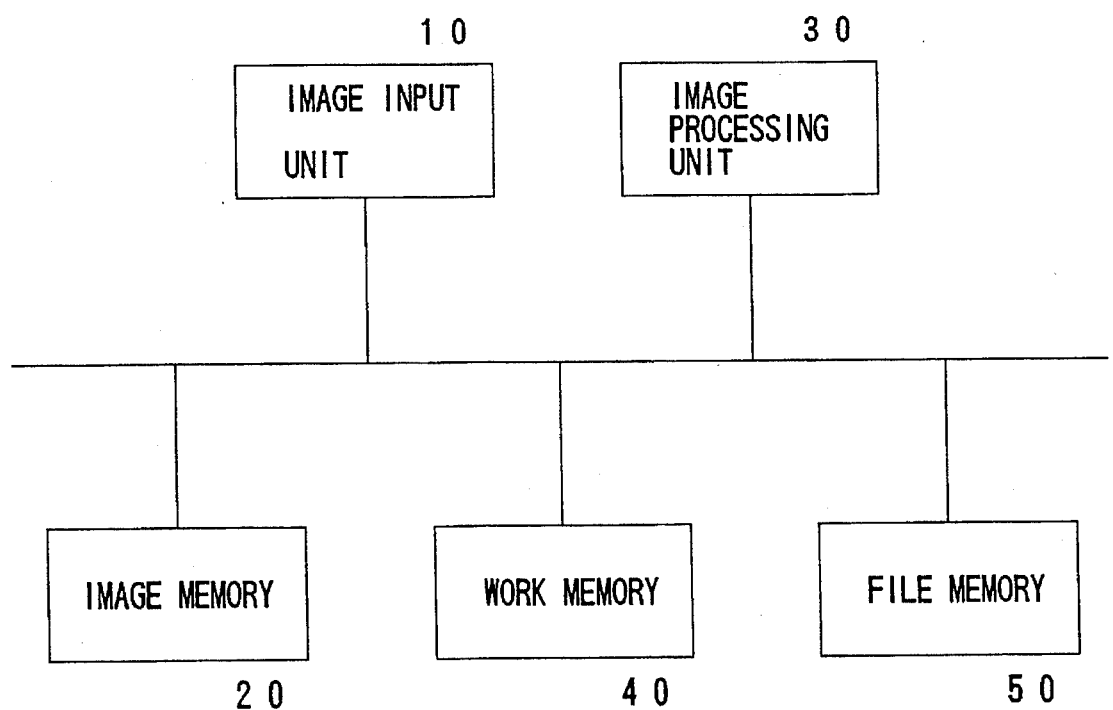
FIG. 2 shows the principle of an embodiment of a hardware construction for realizing the method shown in FIG. 1.

A principle of hardware construction of one embodiment of a character reading method according to the present invention will now be described with reference to FIG. 2. In FIG. 2, an image input unit 10 includes a scanner and inputs a document including handwritten characters. The input document is stored in a memory 20 where the input document has become corresponding binary image information in which "1" is assigned to a black pixel while "0" is assigned to a white pixel. an image processing unit 30 appropriately performs various processes on the image information which has been read from the image memory 20. In this embodiment, the image processing unit 30 performs processes, shown in FIG. 1, to be described below. A work memory 40 (see FIG. 2) is used for storing information, as necessary, while the image processing unit 30 acts. A file memory 50 is used for storing information, including a final processing result and information concerning various kinds of dictionaries for reading characters, which information is used by the image processing unit 30.

Following, the principle of an entire process sequence in the embodiment according to the present invention will now be described with reference to FIG. 1. The process sequence comprises an image input process S100, a character-string (word) extraction process S110 and a character-string (word) reading process S120. The character-string reading process S120 comprises a line thinning process S121, a curve dividing process S122, a partial reading process S123, a network forming process S124, an optimum solution searching process S125. The partial reading process S123 comprises a partial-figure generating process S123-1 and a character reading process S123-2.

In the image input process S100, as mentioned above, through the image input unit 10, a document including handwritten characters is input as binary image information. The character-string extraction process S110 uses a method(s) including a projection method (A) of the prior art such as mentioned above. Thus, a string of characters (word) is extracted by the character-string extraction process S110. These processes may use methods of the prior art. Therefore, a detailed description for the prior art methods will be omitted. Following will be described, using an actual example, the character-string reading process S130 which is essential in the present invention.

[Line Thinning Process]

Figure 3:
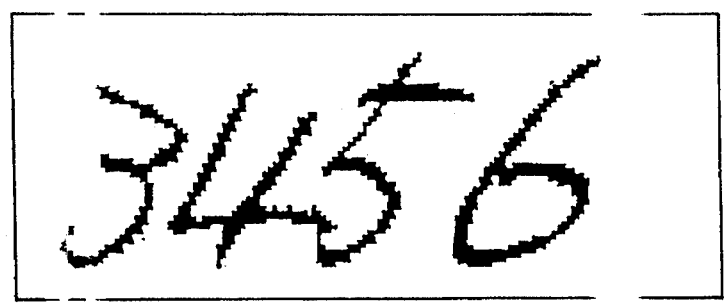
FIG. 3 shows one example of an image comprising a string of characters to be read.

In the line thinning process S121, a shape of each stroke in the extracted string of characters is thinned so as to obtain skeleton data associated with the string of characters. Further, in the process S121, a height (H) and width (W) associated with the entire string of character are detected using the obtained skeleton data. (Hereinafter, The terms "height" and "width" are applied in a case where a string of characters to be dealt with comprises horizontally extending written characters such as shown in FIG. 3. However, the present invention may be applied to another arrangement of a string of characters such as, for example, a vertically extending string of characters. In such a case, the height (H) is replaced by a horizontal width while the width (W) is replaced by a vertical height.)

Figure 4:
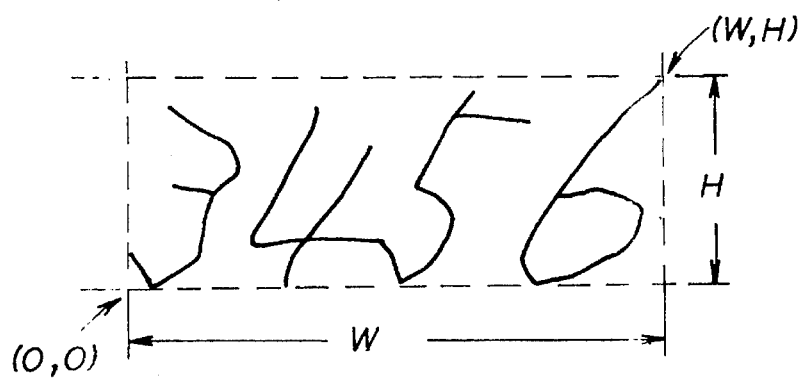
FIG. 4 shows skeleton figures of the image shown in FIG. 3 obtained in the method shown in FIG. 1.

In an example of reading a string of characters shown in FIG. 3, a skeleton figure shown in FIG. 4 is obtained. In the case of FIG. 4, the height (H)=41 while the width (W)=108. Hereinafter, a X–Y coordinate system is used wherein, in FIG. 4, the bottom left vertex coincides with an origin (0, 0) while the top-right vertex coincides with a coordinate point (W, H). Here, the vertexes are, as shown in FIG. 4, opposite vertexes of a rectangle indicated by dashed line, which rectangle is a minimum sized rectangle from among rectangles enclosing the string of characters, that is, the minimum sized rectangle is a rectangle circumscribing the string of characters. Further, the minimum sized rectangle is that comprising two opposite edges respectively extending along a line parallel to a line along the string of characters.

[Curve Dividing Process]

In this process S122, the skeleton figure obtained in the above process S121 is used. The skeleton figure is, first, divided so that either a branch point or an end point in the skeleton figure is selected as a point where the string is to be divided. Thus, the line(s) constituting the skeleton figure is(are) divided into a plurality of fragments. In the example of FIG. 4, as shown in FIG. 5, fragments: simple arcs 0–8, 10 and simple closed curve (loop) 9 are obtained as a result of such dividing operation.

Then, a maximum X-coordinate point (Xmax) and a minimum X-coordinate point (Xmin) are detected for each of the obtained fragments. That is, in FIG. 5, the point Xmin is the leftmost point in each of the fragments while the point Xmax is the rightmost point in each of the fragments. If, a value obtained by a subtraction Xmax−Xmin for one of the fragments is larger than a predetermined value associated with the height (H) of the string of characters, this fragment may comprise not only a part of a first character from among the string of characters but also a part of a second character adjacent to the first character.

Figure 5:
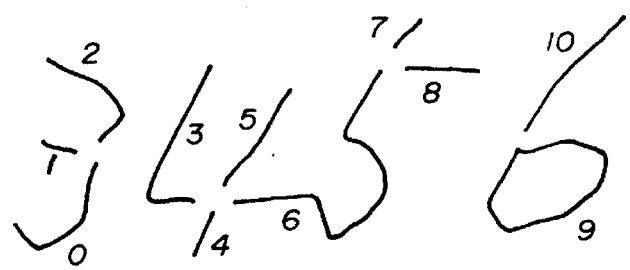
FIG. 5 shows a result of dividing lines constituting the skeleton figures shown in FIG. 4 into simple arcs and simple closed curves according to the method shown in FIG. 1.

In the example of FIGS. 3–5, the numerals "4" and "5" are connected to one another at a connecting point which is neither a branch point nor a crossing point. But this connecting point is a point on the only simple line. Thus, the simple arc 6 in FIG. 5 includes a part of the numeral "4" and also a part of the adjacent numeral "5". This is because, in the above-mentioned dividing operation, such a point on a simple line, neither a branch point nor a crossing point, is not allowed to be selected as a point where dividing is to be performed.

Figure 6:
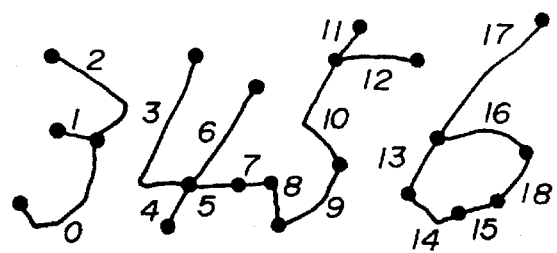
FIG. 6 shows a result of finally dividing lines constituting the skeleton figures shown in FIG. 4 into partial curves or segments according to the method shown in FIG. 1.

In order to prevent such a connection point from remaining undivided, the process S122 also includes the following step. A fragment from the fragments obtained is further appropriately subdivided into sub-divided fragments if the subtraction Xmax−Xmin for the fragment has a value greater than a value a·H (that is, if $$Xmax-Xmin > a \cdot H \tag{1}$$

where the value a is a predetermined parameter; in this embodiment, the value a=0.6. In the example of FIG. 5, the simple arc 6 and simple closed curve 9 respectively fill the condition of the above inequality (1). Thus, the simple arc 6 and simple closed curve 9 are respectively divided into sub-fragments. The result is shown in FIG. 6. In FIG. 6, respective dividing points are indicated by dots (small black circles). Thus, 19 pieces of simple arcs 0–18, as shown in FIG. 6, have been obtained for the skeleton figure lines shown in FIG. 4. Each of these fragments or arcs will be referred to a "segment" hereinafter. As a result, 19 segments exists in FIG. 6.

These segments are assigned a sequence order so as to order the segments according to the sequence order. The sequence order is determined according to magnitudes of center X-coordinate values respectively associated with the segments. Each of these center X-coordinate values may be obtained from the calculation (Xmax−Xmin)/2 to be performed for each segment. If the center X-coordinate values are identical to one another for different segments, then a sequence order between them may be determined according to the values Xmin associated with the segments. In FIG. 6, the numerals 0–18 were respectively determined for the segments as per the sequence order given by the above-mentioned rule. Each segment has information comprising: the maximum and minimum coordinate values with respect to X- and Y-coordinates (Xmax, Xmin, Ymax and Ymin)

from among all points existing on the segment; the length of the segment; and coordinate values of the points existing on the segment. The above values Xmax, Xmin, Ymax and Ymin, and the length are shown for each segment 0–18 in FIG. 7.

[Partial Reading Process]

This process S123 comprises the partial-figure generating process S123-1 and the character reading process S123-2 as mentioned above.

In the process S123-1, first, two parameters "s" (start) and "e" (end) are given, where $s \leq e$. Then, points existing on segments starting from the segment number s and ending at the segment number e are extracted. Then, using the extracted points, partial figures are generated from the skeleton figures as shown in FIG. 4. Here, in order to achieve efficiency, the following methods (A) and (B) are used in this generation. Thus, only figures each of which has a width sufficiently short, and has a height sufficiently long, with respect to the height H of the string of characters are generated.

(A) If $$Xmax(e) > Xmin(s) + b \cdot H \quad (2),$$

the partial figure is not generated for the given numbers s and e where Xmax(e) is the maximum X-coordinate value of the segment number e and Xmin(s) is the minimum X-coordinate value of the segment number s. Further, the value b in the above inequality (2) is a positive parameter predetermined to be from 1.5–2.0.

(S) If $$Y1 - Y0 < b^a \cdot H \quad (3),$$

the partial figure is not generated for the given numbers s and e where Y0 is the minimum Y-coordinate value from values respective associated with points existing on the partial figure made of the segments starting from the number s and ending at the number e. Further, Y1 is the maximum Y-coordinate value from the values respectively associated with points existing on the partial figure made of the segments starting from the segment number s and ending at the segment number e. Further, the value $b^a$ in the above inequality (3) is a positive parameter predetermined to be from 0.3–0.8.

In other words, the partial figure is generated for the given numbers s and e only if $$Xmax(e) \leq Xmin(s) + b \cdot H \text{ and } Y1 - Y0 \geq b^a \cdot H.$$

Figures 8A, 8B, 8C, 8D, 8E, 8F:
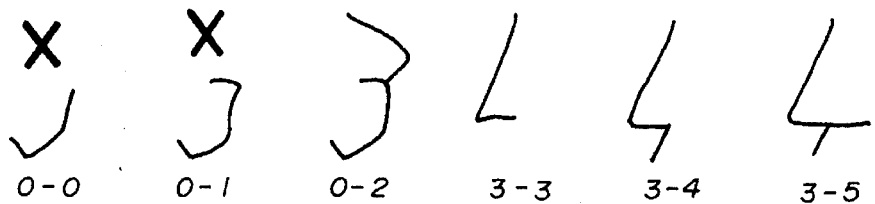
FIGS. 8A–8Z, 8AA, 8BB, 8CC, 9A–9Z, 9AA, 9BB and 10A–10O show various partial figures formed from the segments shown in FIG. 6, obtained in the method shown in FIG. 1.
Figures 8G, 8H, 8I, 8J, 8K, 8L:
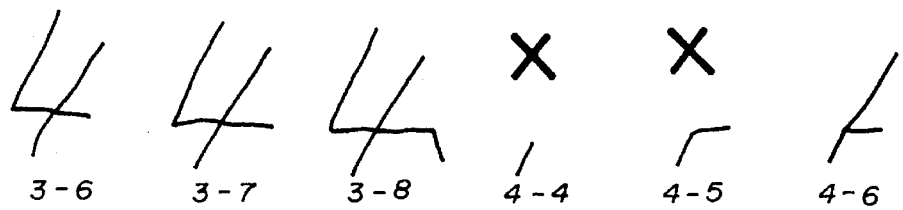
Figures 8M, 8N, 8O, 8P, 8Q, 8R:
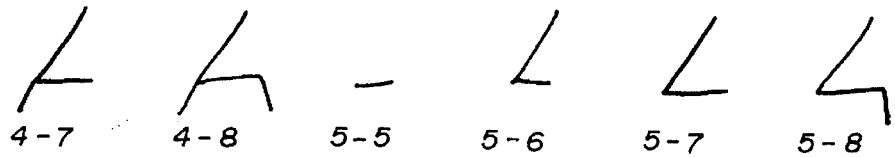
Figures 8S, 8T, 8U, 8V, 8W:
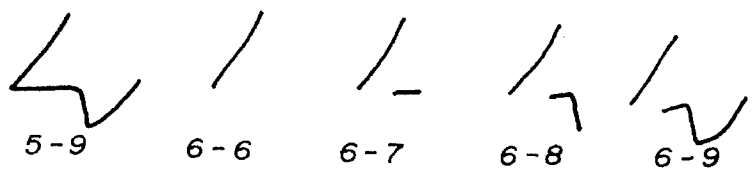
Figures 8A, 8B, 8C, 8X, 8Y, 8Z:
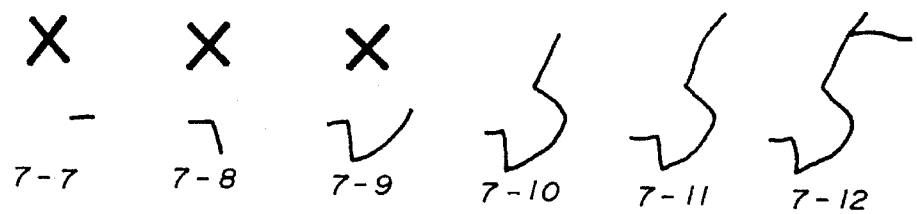
Figures 9A, 9B, 9C, 9D, 9E:
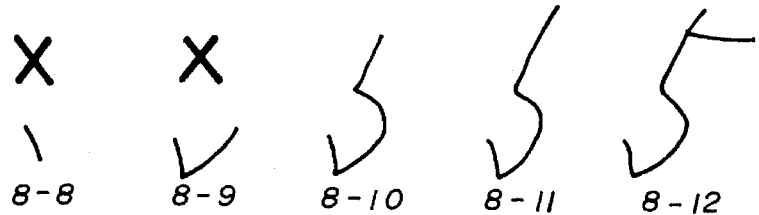
Figures 9F, 9G, 9H, 9I, 9J, 9K:
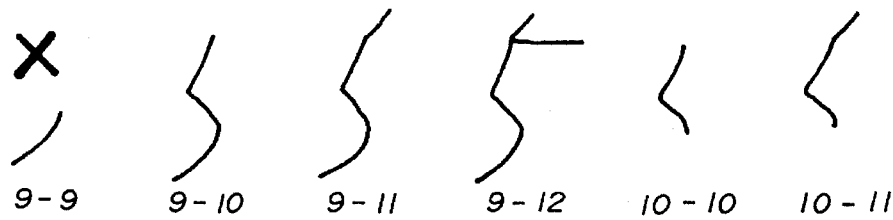
Figures 9L, 9M, 9N, 9O, 9P, 9Q:
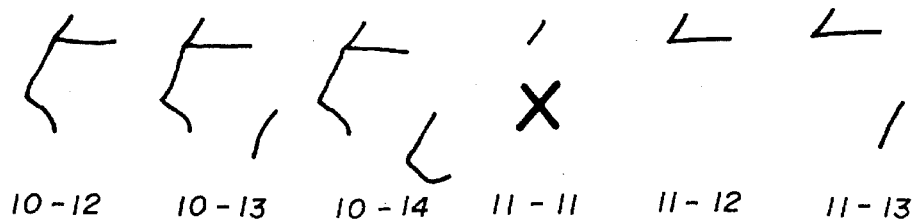
Figures 9R, 9S, 9T, 9U, 9V:
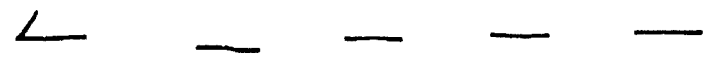
Figures 9A, 9B, 9W, 9X, 9Y, 9Z:
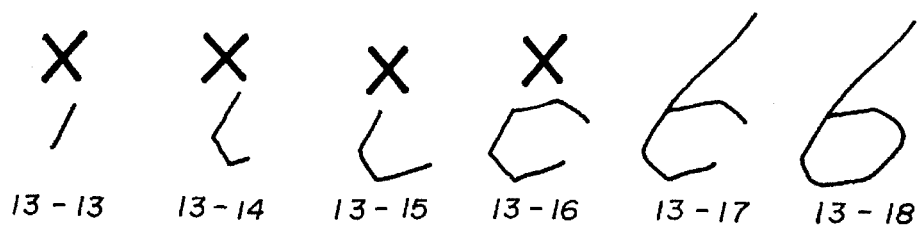
Figures 10A, 10B, 10C, 10D, 10E:
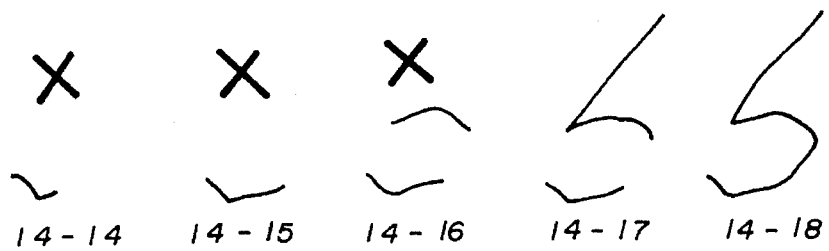
Figures 10F, 10G, 10H, 10I, 10J, 10K:
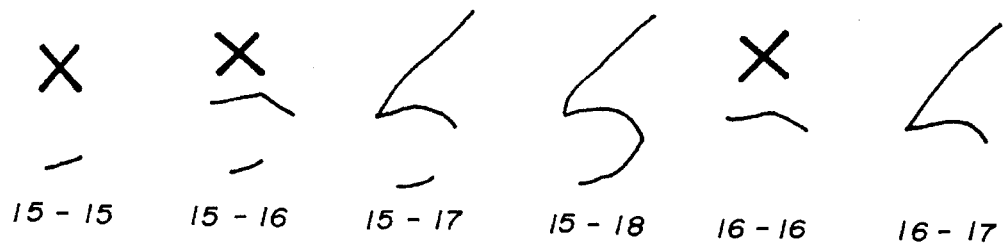
Figures 10L, 10M, 10N, 10O:
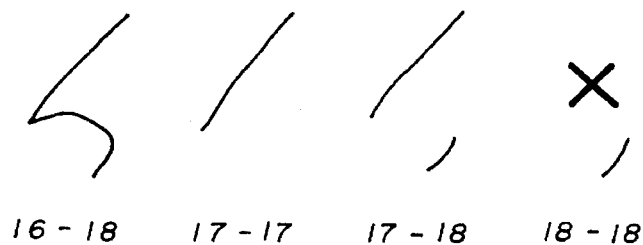

The partial figures generated in the partial-figure generating process 123-1 for the example of FIG. 6 are shown in FIGS. 8A–8Z, 8AA, 8BB, 8CC, 9A–9Z, 9AA, 9BB and 10A–10O. In these figures, in the example of FIG. 8C, the numerals "0–2" indicated at the bottom of the have meaning as follows. The numeral "0" from the "0–2" means the segment number s; the numeral "2" therefrom means the segment number e. Figures to which the symbol "X" is added at the top thereof, including, for example, the partial figures of FIG. 8A, 8B, 8J, 8K, 8X, 8Y and 8Z, are rejected from generation even though they may be determined as partial skeleton-lines. This rejection is because of the above-mentioned condition:

$$Xmax(e) \leq Xmin(s) + b \cdot H \text{ and } Y1 - Y0 \geq b^a \cdot H.$$

In the partial reading process 123-2, the partial figures generated in the above process 123-1 are respectively read. Thus, one (or more) candidate(s) character is(are) found for each partial figure and a degree(s) of similarity is(are) detected between the partial figure and the found candidate character (s). The method for this reading may be any of the methods which have been proposed. For example, the reading method disclosed in the Japanese Land-Open Patent Application 3-108079. Each degree of similarity to be detected is standardized between 0–1.

This reading is performed on all partial figures shown in FIGS. 8A–8Z, 8AA, 8BB, 8CC, 9A–9Z, 9AA, 9BB and 10A–10O except for those to which the symbols "X" were given. As a result, some of them can not be read as characters, that is, they have been rejected. Thus, partial figures read are shown in FIG. 11, there being 12 such partial figures. In the table shown in FIG. 11, the leftmost column headed "NO." is for the number assigned to each of the read partial figures. The column next of the leftmost column headed "SEGMENT NO." is for the corresponding segment numbers e through s, such as mentioned above, of the segments constituting the partial figure. Other columns respectively headed "Xmin", "Xmax", "Ymin" and "Ymax" are respectively for the minimum and maximum X- and Y-coordinate values associated with the partial figure. A column headed "LENGTH" means a total length of the segments constituting the partial figures. A column headed "CHARACTER CODE" is for the character code corresponding to the character to which the partial figure has been read as corresponding. A column headed "DISTANCE" is for the degree of similarity between the corresponding candidate character and the partial figure. The column headed "SCORE" is for a score assigned to the partial figure, which score comprises a value obtained as a result of a multiplication (degree of similarity)*(length) where the degree of similarity and length are respectively associated with the partial figure. The number assigned for each read partial figure is determined successively according to a sequence order of all the read partial figures. An attempt is made to order this sequence first according to the corresponding numbers s, otherwise according to the corresponding numbers e, for example, in a situation where the numbers s are identical to one another where the numbers s and e are respectively numbers associated with the partial figures. FIG. 11 shows the result of this determination for this example.

[Network Forming Process]

In the process S124, a network is formed for the partial figures read in the above process S123-2. Nodes associated with the network comprise special nodes ROOT, END, and nodes respectively corresponding to the partial figures. The nodes respectively corresponding to the partial figures are respectively provided with their numbers 0, 1, ..., Nn−1 which numbers have been determined as mentioned above where Nn is the number of the read partial figures.

Next, links are made respectively between one and another among the nodes corresponding to the partial figures. Hereinafter, symbols i and j will be respectively referred to as the determined numbers of the partial figures where i<j. Further, s(i) and e(i) will respectively be referred to as the starting and ending segment numbers s and e associated with the partial figure number i. Xmin(i), Xmax(i), Ymin(i) and Ymax(i) will respectively be referred to as the minimum and maximum X- and Y-coordinate values associated with the partial figure number i. Similarly, s(j) and e(j) will respectively be referred to as the starting and ending segment numbers s and e associated with the partial figure number j; and Xmin(j), Xmax(j), Ymin(j) and Ymax(j) will respectively be referred to as the minimum and maximum X- and Y-coordinate values associated with the partial figure number j. Further, the nodes i and j in the network are connected and oriented in a direction from i to j if the following conditions 1–4 are all fulfilled.

1. $e(i) \leq s(j)$.
2. $Xmax(i) - Xmin(3) < c \cdot H$, where the value c is a positive parameter predetermined from among 0.2–0.4. This condition is required so as to prevent the partial figures i and j being excessively close horizontally from being selected for connecting with the link. This being excessively close is such as at least a portion of one overhangs or overlaps a portion of another.

3. $Xmin(i) + d \cdot H > Xmin(j)$, where the value d is a positive parameter predetermined to be 1.5–2.5. This condition is required so as to prevent a degree of mutual horizontal separation of the partial figures i and j being excessively large from being selected for connecting with the link.

4. A height of a rectangle will be referred to as dy, which rectangle comprises two opposite edges extending parallel to a line along the extension of the string of characters. Thus, in the example of FIG. 3, the two opposite edges are those respectively extending horizontally. Further, this rectangle simultaneously circumscribes two partial figures i and j. In other words, this rectangle is the minimum sized rectangle which can surround the two partial figures i and j.

Further, a height range will be referred to as oy, by which height range, two rectangles overlap or are in contact with one another. That is, oy denotes the range of height by which the top of one rectangle is higher than the bottom of the adjacent rectangle in this situation of the rectangles. There, these rectangles are respectively rectangles as described below. Each of these rectangles comprises two opposite edges extending parallel to a line along the extension of the string of characters. Thus, in the example of FIG. 3, the two opposite edges are those respectively extending horizontally. There, these rectangles respectively circumscribe two partial figures i and j. In other words, one of these rectangles is the minimum sized rectangle which can surround the partial figure i. Further, the other of these rectangles is the minimum sized rectangle which can surround the partial FIG. j.

Then, if $Xmax(i) \geq Xmin(j)$, it should be that $oy > f \cdot dy$, where the value f is a positive parameter predetermined to be 0.5–0.9. This condition is required so as to ensure the following condition. Either if the partial figures i and j are in contact with one another horizontally or if they overlap one another, the heights and vertical positions respectively associated with the partial figures i and j should be approximately equal to one another.

Further, the formed links are respectively given weights as follows.

1. The weight is "0" either if $e(i) = s(j)$ or if $e(i) + 1 = s(j)$.
2. The weight is a total of the sum of the lengths respectively associated with the segments starting from the segment number $e(j)+1$ and ending at the segment number $s(j)-1$.

Further, links are respectively formed from the node ROOT to the nodes i corresponding to the partial figures only if $Xmin(i) < d \cdot W$ where the value d is the parameter mentioned above. Further, lines are respectively made from the nodes i corresponding to the partial figures to the node END only if $Xmax(i) > (1-d) \cdot W$.

Hereinafter, an example will be described wherein it is assumed there are Nb pieces of the segments and the segment numbers 0–(Nb–1) are respectively assigned to the segments. Then, the weights to be respectively given to the links from ROOT to the nodes i are determined as follows. The weight is "0" if $s(i)=0$. The weight is to be a total of the sum of the lengths respectively associated with the segments starting from the segments number 0 and ending at the segment number $s(i)-1$ if it is not the case that $s(i)=0$. Further, weights are respectively given to the links from the nodes i to the node END as follows. The weight is "0" if $e(i)=Nb-1$. The weight is a total of the sum of the lengths respectively associated with the segments starting from the segments number $e(i)+1$ and ending at the segment number $Nb-1$ if it is not the case that $e(i)=Nb-1$.

Figure 12:
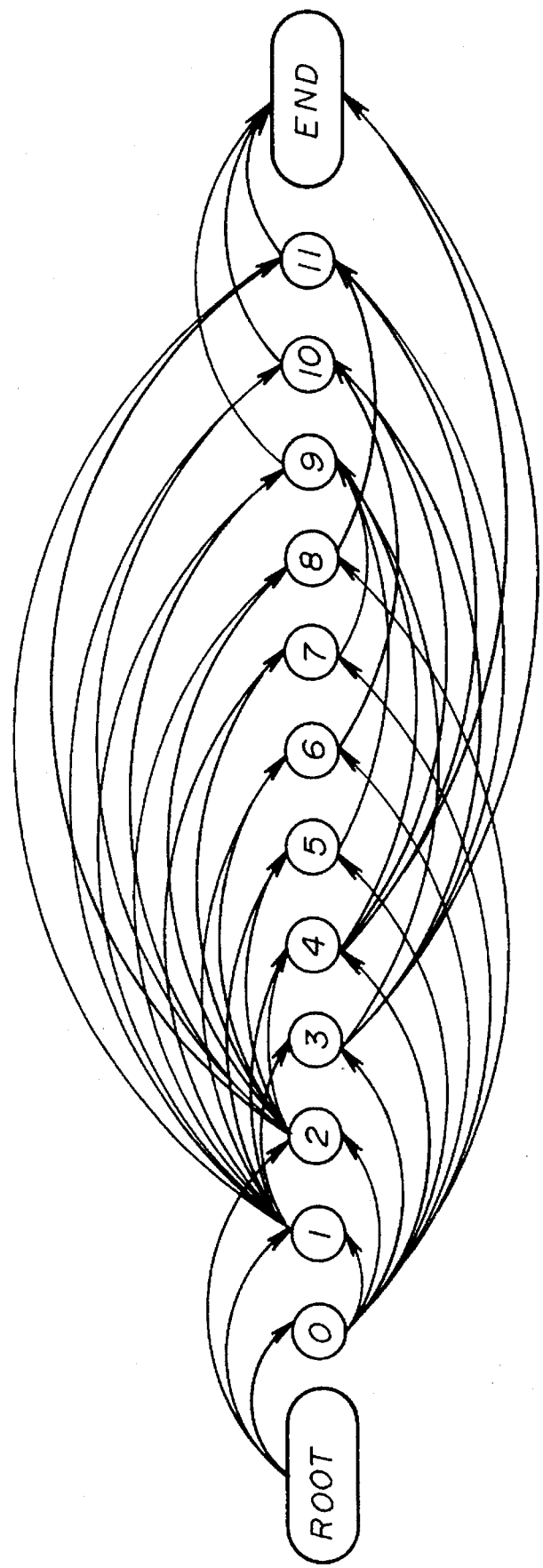
FIG. 12 shows a network formed in the method shown in FIG. 1 for the partial figures shown in FIG. 11.

The network formed as mentioned above for the example of FIG. 11 is shown in FIG. 12. In this example, Nn=12. Such a network will be referred to as a "weighting oriented network". FIG. 13 shows the network shown in FIG. 12 in a table format.

[Optimum Solution Searching Process]

In the process S125, a so-called "dynamic programming method is utilized. There, a so-called "depth-first search" is performed for reading the string of characters. (The term "depth-first search" is disclosed in a Japanese publication "ARTIFICIAL INTELLIGENCE HAND BOOK (FIRST EDITION)" complied by Avron Bart/Edward A. Feigenbaum, translated by Kokichi Tanaka/Kazuhiro Fuchi and published by Kyoritsu Publishing Inc., chapter II "Search", C1. "Blind State Space Search", pages 56–.) In this searching, an optical path is searched for, to from among the paths, starting from the node ROOT and ending at the node END, available in the above-mentioned weighting oriented network obtained in the network forming process S124. In this method, each path from among the paths in the network comprises successive nodes which will be respectively referred to as ROOT N(1), N(2), ..., N(m), END. Here, each node N(i), where i=1, 2, ..., m, indicates the number of the corresponding partial figure. In this method, the following two performance functions are used.

(1). A factor S, to be obtained for each path, resulting from summing scores for the partial figures N(i) (i=1, 2, ..., m) existing in the path. Here, each of these scores results from a multiplication (a degree of similarity between the partial figure and the reference pattern associated with the corresponding read character)*(a length of a line representing the partial figure).

(2). A factor U, to be obtained for each path, resulting from, summing the weights respectively associated with the links respectively connecting the nodes ROOT and N(1), N(1) and N(2), ..., N(m–1) and N(m), N(m) and END, these links jointly constituting the path.

In this method, a path is searched for, from among the paths, that has the minimum factor U among those respectively associated with the paths. If there are a plurality of paths respectively having the minimum factor U, a path is selected from among the paths which path has the maximum factor S among those respectively associated with the paths. Further, there is a predetermined allowable range for the factors U. This predetermined allowable range is that the factor U should be equal to or less than a value U0. Here, $U0 = g \cdot L$, where the value L comprises the total length of the lines constituting the skeletons of the partial figures. These partial figures respectively correspond to the nodes included in the path. Further, the value g is a predetermined positive parameter predetermined from a range 0–0.2.

The minimum factor U may have a value equal or less than the value U0 in the selected path. If so, the characters which the corresponding partial figures N(i) (i=1, 2, ..., m) are respectively read as corresponding to, are then output, as the result of the current reading, in accordance with this indicated sequence. On the other hand, if the minimum factor U has a value more than the value U0, a result "reject" is then output.

During the vertical searching for the network mentioned above, the conditions described below may be examined so as to eliminate unnecessary steps so as to achieve an efficient proceeding of the method. In the path having the nodes ROOT, $n(1)$, $n(2)$, ..., $n(k)$, the conditions described below are examined for the currently reached node $n(k)$ and the nodes $n(1)$, $n(2)$, ..., $n(k-1)$ prior to the currently reached node $n(k)$. Here, $n(i)$, $i=1, 2, ..., k$ are the numbers of the corresponding partial figures. Further, $s(i)$ and $e(i)$ respectively indicate the numbers of the first and last segments from among the segments constituting the partial figure i. Further, $Xmin(i)$, $Xmax(i)$, $Ymin(i)$ and $Ymax(i)$ respectively indicate the minimum and maximum X- and Y-coordinate values from among the coordinate values associated with the partial figure i.

A. A total sum of the weights is referred to as $U(k)$. The total sum of weights is of the weights respectively having been determined as mentioned above for the links respectively connecting between the nodes ROOT and $n(1)$, $n(1)$ and $n(2)$, ..., $n(k-1)$, $n(k)$, and END. If the obtained total sum $U(k) > U0 = g \cdot L$ already, then it can be determined that the weights only include a weight 0 or a positive weight. In this case, it can be determined that the factor U of the performance function could not have become a value equal to or less than the U0 even if the further vertical searching for nodes connected subsequent thereto was performed. Thus, the further vertical searching operation for the nodes located subsequent to the node $n(k)$ will not be performed.

B. If $e(n(i)) > s(n(k))$ for any i from among 1, 2, ..., k-1, a further vertical searching for the nodes subsequent to the node $n(k)$ will not be performed.

C. If $Xmax(n(i)) - Xmin(n(k)) \geq c \cdot H$ for any i from among 1, 2, ..., k-1, a further vertical searching for the nodes subsequent to the node $n(k)$ will not be performed. Here, the value c is the above-mentioned parameter.

D. If $Xmin(n(i)) + d \cdot H \leq Xmin(n(k))$ for any i from among 1, 2, ..., k-1, a further vertical searching for the nodes subsequent to the node $n(k)$ will not be performed. Here, the value d is the above-mentioned parameter.

E. A height of a rectangle which is that comprising two opposite edges extending parallel to a line along the extension of the string of characters will be referred to as $dy(i)$. Thus, in the example of FIG. 3. the opposite two edges are those respectively extending horizontally. Further, this rectangle simultaneously circumscribes the partial figure $n(i)$ ($i=1, 2, ..., k-1$) and the partial figure $n(k)$. In other words, this rectangle is the minimum sized rectangle which can surround the two partial figures.

Further, a height range will be referred to as $oy(i)$, by which height range, two rectangles overlap or are in contact with one another. That is, $oy(i)$ denotes the range of height by which the top of one rectangle is higher than the bottom of the adjacent rectangle in this situation of the rectangles. There, these rectangles are respectively rectangles as described below. Each of these rectangles comprises two opposite edges extending parallel to a line along the extension of the string of characters. Thus, in the example of FIG. 3, the two opposite edges are those respectively extending horizontally. There, these rectangles respectively circumscribe two partial figures $n(i)$ ($i=1, 2, ..., k-1$) and the partial figure $n(k)$. In other words, one of these rectangles is the minimum sized rectangle which can surround the partial figure $n(i)$ ($i=1, 2, ..., k-1$). Further, the other of these rectangles is the minimum sized rectangle which can surround the partial figure $n(k)$.

Then, if $Xmax(n(i)) \geq Xmin(n(k))$ and also $oy(i) \leq f \cdot dy(i)$ for any i from among 1, 2, ..., k-1, a further vertical searching for the nodes subsequent to node $n(k)$ will not be performed. Here, the value f is the above-mentioned parameter.

Figure 14:
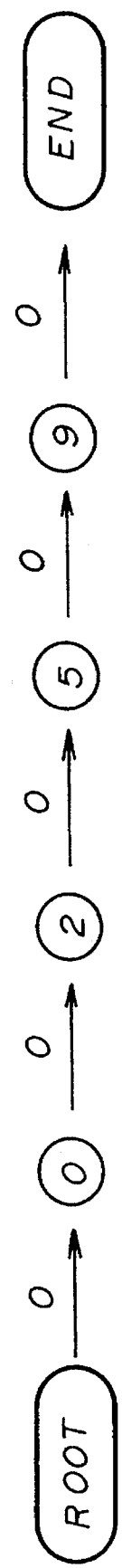
FIG. 14 shows a result of an optimum solution searching in the method shown in FIG. 1 for the network shown in FIG. 12.
Figure 15:
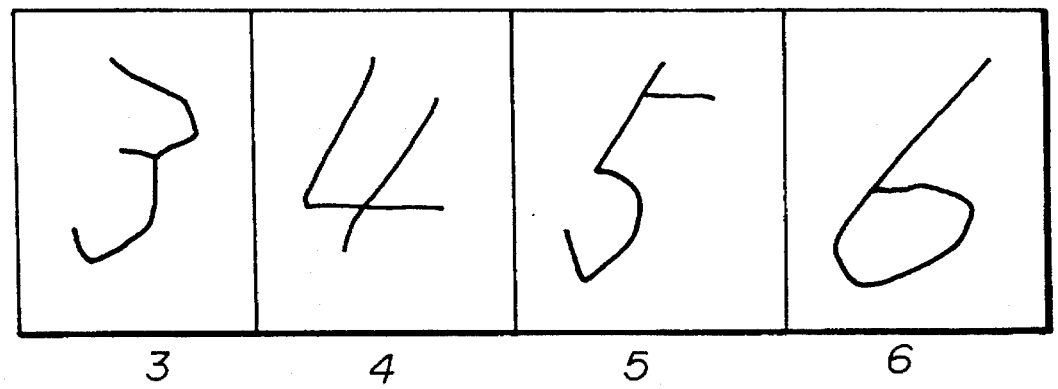
FIG. 15 shows characters respectively corresponding to nodes shown in FIG. 14.

In the example of FIGS. 12 and 13, the optimum solution is thus determined as that shown in FIG. 14. Here, U=0 and S=76.43. Subsequently, the series of the numerals "3456", each number of which respectively results from reading the partial figures respectively corresponding to nodes "0", "2", "5" and "9" shown in FIG. 14, is output as the result of the current reading operation. In another view point, this operation may also be defined as follows. Using the partial figures respectively corresponding to the nodes existing on the path, the skeleton associated with the string of characters shown in FIG. 4 is split into four pieces so as to result in the state shown in FIG. 15.

Further, if the number of characters constituting the string of characters is input, a method described below may be performed instead of the corresponding method mentioned above.

The searching is performed only for paths having above-mentioned numbers m associated therewith, which numbers m respectively coincide with the input number of characters. The path is searched for, from among the paths, which path has the minimum factor U associated therewith among all of the paths. If there are a plurality of paths respectively corresponding to the minimum factor U, a path is selected which, among all of the paths, has the maximum factor S associated therewith. The minimum factor U may have a value equal to or less than the value U0 in the selected path. If so, the characters which the corresponding partial figures N(i) (i=1, 2, ..., m) are respectively read as being are then output, as the result of the current reading, in accordance with this indicated sequence. On the other hand, if the minimum factor U has a value more than the value U0, a result "reject" is output.

Further, if a number of characters constituting the string of characters is input as mentioned above, a method described below may be performed during the vertical searching for the network mentioned above instead of the above-mentioned corresponding method. That is, the conditions described below may be examined so as to eliminate useless steps and enable the method to proceed efficiently. In the path having the nodes ROOT, $n(1)$, $n(2)$, ..., $n(k)$, the conditions described below are examined for the currently reached node $n(k)$ and the nodes $n(1)$, $n(2)$, ..., $n(k-1)$ prior to the currently reached node $n(k)$. Here, $n(i)$, $i=1, 2, ...,$ and k denote the numbers of the corresponding partial figures.

If the number k is greater than the above-mentioned input number, a further vertical searching for the nodes subsequent to the node $n(k)$ will not be performed.

Another example for the character reading processes according to the same embodiment of the present invention will now be described with reference to FIGS. 16–24.

Figure 16:
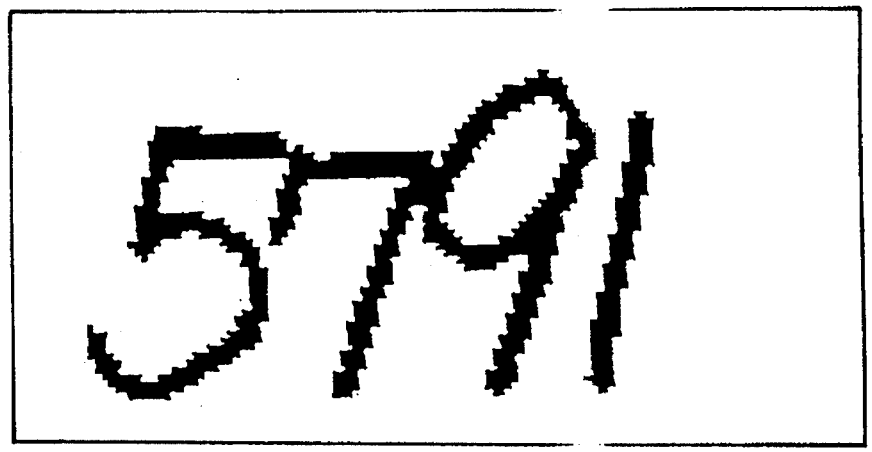
FIG. 16 shows another example of an image comprising a string of characters to be read.

As shown in FIG. 16, the numerals "5" and "7" are in contact with one another and the numerals "7" and "9" are in contact with one another, in this example of the input image representing a string of characters. A skeleton-line figure is then generated from the input image. There, the width (W) and height (H), such as mentioned above, associated with the string of characters are detected from this skeleton-line data. In this example, W=79 while H=42.

Figure 17:
FIG. 17 shows skeleton figures of the image shown in FIG. 16 obtained in the method shown in FIG. 1.
Figure 18:
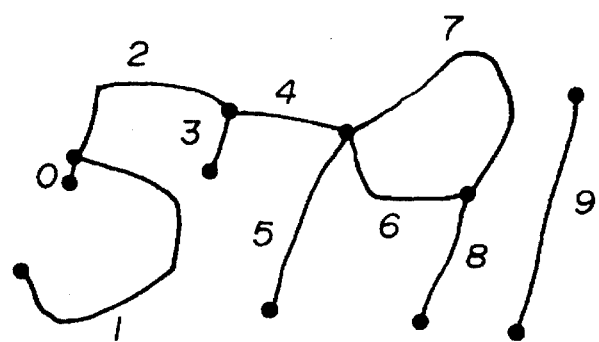
FIG. 18 shows a result of dividing lines constituting the skeleton figures shown in FIG. 17 into simple arcs and simple closed curves according to the method shown in FIG. 1.

Then, the 10 segments 0–9 such as mentioned above are determined from the skeleton-line figures shown in FIG. 17 as mentioned above, as shown in FIG. 18. the minimum and maximum X- and Y-coordinate values Xmin, Xmax, Ymin, Ymax, and the lengths such as mentioned above are then detected from among the points existing on each segment as shown in FIG. 19.

Partial figures are then formed, similarly to as mentioned above, from the 9 segments shown in 18. Then, as a result of the reading trial for each formed partial figure, partial figures, as shown in FIG. 20, are selected. The shown partial figures are the figures able to be interpreted by the character reading process. The shown partial figures exclude those rejected partial figures. The number of the shown partial figures is 6. The meaning of FIG. 20 is similar to that of FIG. 11. The scores have been respectively calculated as results of multiplications: (degrees of similarity)*(lengths).

Figure 21:
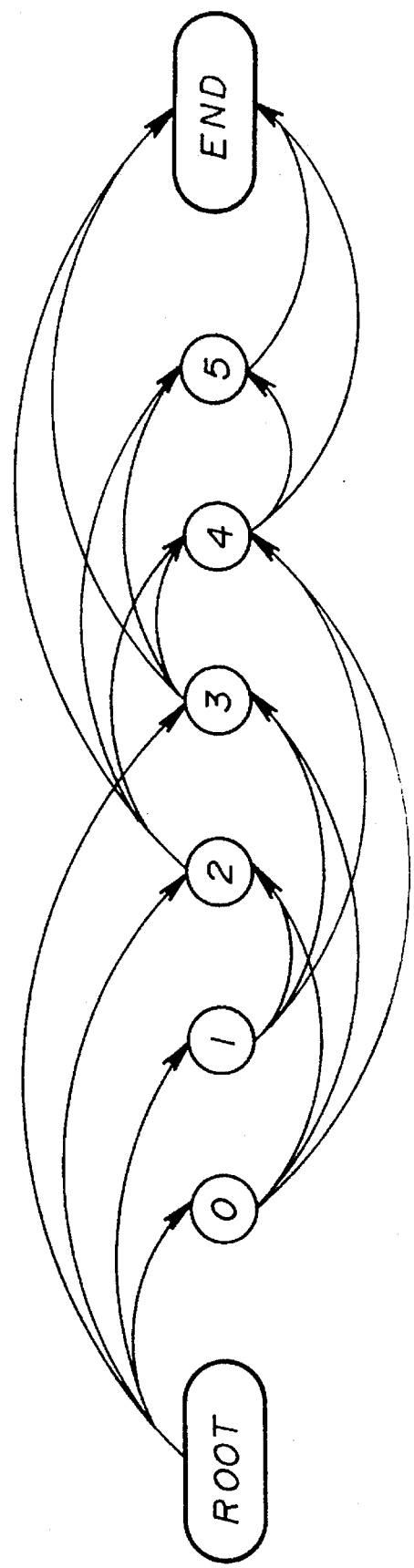
FIG. 21 shows a network formed in the method shown in FIG. 1 for the partial figures shown in FIG. 20.
Figure 23:
FIG. 23 shows a result of an optimum solution searching in the method shown in FIG. 1 for the network shown in FIG. 21.
Figure 24:
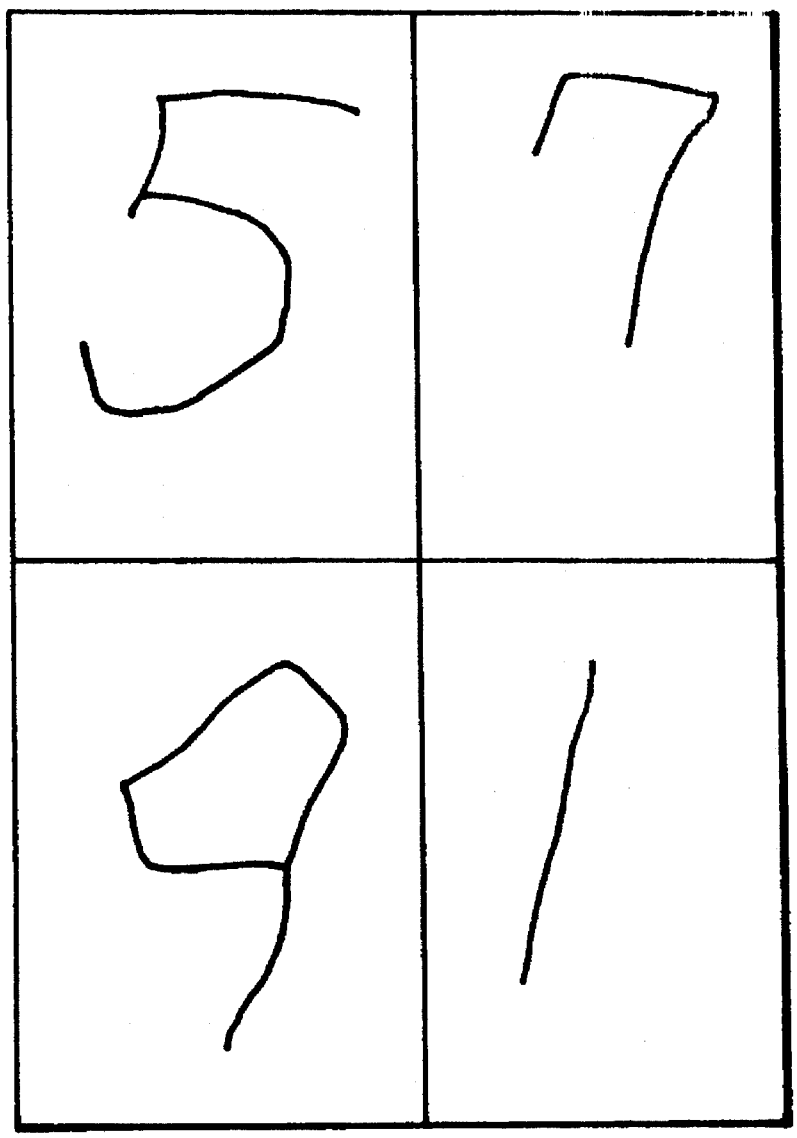
FIG. 24 shows characters respectively corresponding to nodes shown in FIG. 23.

FIGS. 21 and 22 respectively represent the weighting oriented network formed for the partial figures shown in FIG. 20. FIG. 23 shows the optimum path obtained by a searching operation similar to as mentioned above performed on the network shown in FIGS. 21 and 22. In the optimum path, U=0 while S=77.55. Subsequently, the series of numerals "5791" each numeral of which respectively results from reading the partial figures respectively corresponding to "0", "2", "4" and "5" shown in FIG. 23 is output as the result of the current reading operation. This operation may be defined in other words as follows. Using the partial figures respectively corresponding to the nodes existing on the path, the skeleton associated with the string of characters shown in FIG. 17 splits the four pieces so as to result in the state shown in FIG. 24.

Further, the present invention is not limited to the above described embodiments, and variations and modifications may be made without departing from the scope of the present invention.

What is claimed is:

1. A character reading method comprising steps of:

an inputting step (a-1) for inputting a character line including a plurality of characters which have been written, the inputting of said character line being performed after all of said plurality of characters have been written;

a dividing step (a-2) for dividing into segments said character line;

a partial-figure forming step (b) for forming partial figures by combining segments from among said thus obtained segments;

a character reading step (c) for attempting to read each of said partial figures as a character;

a network forming step (d) for forming a network wherein partial figures, among the partial figures in said character-reading step (c) are used as nodes and said nodes are connected with one another by links, and wherein said links respectively have appropriate weights; and an optimum-path selecting step (e) for selecting an optimum path from among paths existing in said network so that said optimum path comprises nodes, from among said nodes, which respectively appropriately correspond to said plurality of characters, wherein the optimum-path selecting step includes using a total length of the line segments existing between two adjacent partial figures among said partial figures.

2. The character reading method according to claim 1, further comprising a line determining step (f) for determining said character line from the input image comprising said input characters by thinning a shape of each element among the elements constituting said input image so as to obtain said line therefrom.

3. The character reading method according to claim 1, wherein said optimum-path selecting step (e) using a value corresponding to a degree to which each of said partial figures approximates a character, said degree being determined based on a result of said character reading step (c) of said partial figures.

4. The character reading method according to claim 1, wherein, in a case where a number of said input characters is input, said optimum-path selecting step (e) selects an optimum path from among paths each of which comprises a number of nodes, which number is identical to said input number of said input characters.

5. The character reading method according to claim 1, wherein said dividing step (a-2) divides said input line either at a branching point or at an end point of said line.

6. The character reading method according to claim 5, further comprising a sub-dividing step (a-1) further dividing the segment obtained by said dividing step (a-2) if said segment has a shape determined as one that may comprise a plurality of segments respectively belonging to different characters among said input characters.

7. The character reading method according to claim 1, wherein said network forming step (d) connects the nodes so as to form the link only where at least one portion of one of the partial figures corresponding to said nodes overhangs or overlaps a portion of another partial figure more than a predetermined degree.

8. The character reading method according to claim 1, wherein said network forming step (d) connects the nodes so as to make the link only where the partial figures corresponding to said nodes are apart from one another by more than a predetermined degree of separation.

9. The character reading method according to claim 1, wherein said network forming step (d) connects the nodes so as to form the link only where the partial figures corresponding to said nodes are aligned with another partial figure at least to a predetermined degree.

10. The character reading method according to claim 1, wherein said partial-figure forming step (b) combines the segments only where, in the string of said input characters, a length, along a direction parallel to the extension direction of said string, of said partial figure is shorter than a predetermined amount and another length, along a direction perpendicular to the extension of said string is longer than a predetermined amount.

11. A character reading apparatus comprising:

inputting means for inputting a character line including a plurality of characters which have been written, said inputting means inputting said character line after all of said plurality of characters have been written;

dividing means for dividing into segments said character line;

partial-figure forming means for forming partial figures by combining segments from among said thus obtained segments;

character reading means for attempting to read each of said partial figures as a character;

network forming means for forming a network wherein partial figures, among the partial figures used by said character-reading means are used as nodes and said nodes are connected with one another by links, and wherein said links respectively have appropriate weights; and optimum-path selecting means for selecting an optimum path from among paths existing in said network so that said optimum path comprises nodes, from among said nodes, which respectively appropriately correspond to said plurality of characters, wherein the optimum-path selecting means includes means for using a total length of the line segments existing between two adjacent partial figures among said partial figures.

* * * * *

UNITED STATES PATENT AND TRADEMARK OFFICE
CERTIFICATE OF CORRECTION

PATENT NO. : 5,497,432
DATED : March 5, 1996
INVENTOR(S) : Hirobumi NISHIDA

It is certified that error appears in the above-indentified patent and that said Letters Patent is hereby corrected as shown below:

Col. 7, line 30, delete "(S)" and insert, therefor, --(B)--.

Col. 9, line 5, delete "Xmax(i)-Xmin(3)<c·H," and insert, therefor, --Xmax(i)-Xmin(j)<c·H,--.

Signed and Sealed this

Thirtieth Day of July, 1996

Attest:

BRUCE LEHMAN

*Attesting Officer*     *Commissioner of Patents and Trademarks*